June 9, 1925.

L. A. LAMMERTS

ACCUMULATOR

Filed Dec. 26, 1923

1,540,847

Inventor
L. A. Lammerts
by
Langner, Parry, Card & Langner
Attys.

Patented June 9, 1925.

1,540,847

UNITED STATES PATENT OFFICE.

LAMBERTUS ALPHONS LAMMERTS, OF ARNHEM, NETHERLANDS.

ACCUMULATOR.

Application filed December 26, 1923. Serial No. 682,818.

*To all whom it may concern:*

Be it known that I, LAMBERTUS ALPHONS LAMMERTS, residing at Arnhem, the Netherlands, have invented certain new and useful Improvements in Accumulators, of which the following is a specification.

The invention relates to an accumulator, whereby use is made of a leaden box or a box lined with lead.

The invention has for its purpose to make an accumulator whereby the positive and negative plates are kept isolated from each other in an efficient and simple way, whereas the accumulator has at small dimensions a great capacity.

It is already known to make an accumulator with a leaden box, whereby the leaden plates separated from each other by means of glass rods rest on rods of isolating-material, by means of noses or projections provided in the hollowed edge of the box.

It is further known to make accumulators, whereby the leaden plates are suspended to glass partitions or the like, which stand on the bottom of the box in leaden slots, so as to prevent displacement or shifting.

With these known accumulators each set of corresponding plates is connected by a bridge-piece, which latter is provided with a connecting-terminal.

With these known accumulators great care is paid to the fact that the various plates cannot come into touch with the leaden lining of the box and that there is always a considerable space between the bottom of the box and the lower side of the plates of both poles.

According to the invention on the other hand the leaden box itself serves as a negative pole.

According to the invention the negative plates may be connected to the bottom of the leaden box, whereas the positive plates, besides their being isolated from the negative plates, are at the same time arranged free or isolated from the bottom and the sides of the leaden box.

According to the invention separators of isolating-material may further be provided between the various leaden plates, which separators extend to the bottom of the box, and project past the negative plates and serve as supports for the positive plates.

The positive plates may according to the invention be further connected to conductive bridge-pieces, which are resting free from the sides of the box on the isolating separators, whereas one of these bridge-pieces forms the positive pole of the accumulator.

An embodiment of the invention is illustrated by way of example in the accompanying drawing.

Figure 1:
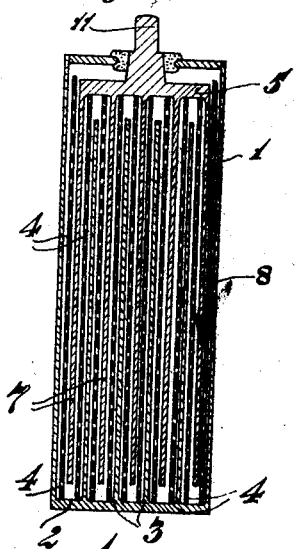
Fig. 1 is a cross-section of an accumulator according to the line I—I in Fig. 2, whereby the cover is not shown.
Figure 2:
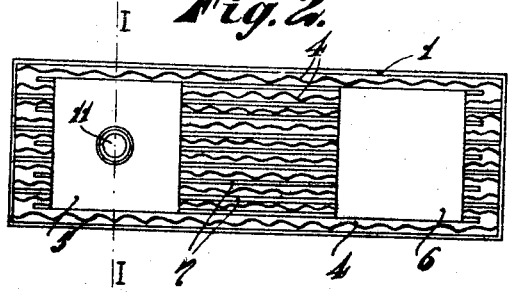
Fig. 2 is a plane-view of Fig. 1.
Figure 3:
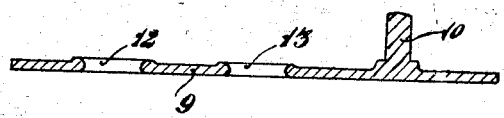
Fig. 3 is a longitudinal section through the cover.

1 is the leaden box, which serves at the same time as a negative pole. To the bottom 2 of this box the negative plates 3 are connected, for example by way of soldering. On the bottom 2 are further separators 4 of isolating-material. These separators project above the negative plates 3 and serve at the same time as supports for the bridge-pieces 5 and 6, to which the positive plates 7 are connected. In contra-distinction with the negative plates 3, there is a considerable space between the bottom 2 and the lower side of the positive plates 7, whereby short-circuiting is prevented. The sides of the box 1 may also be provided with an isolating lining, which especially in connection with the isolation of the bridge-pieces 5 and 6 is to be recommended.

The cover 9 is connected in such a way to the box 1, for example by way of soldering that a close connection between box and cover results. In this way by means of the box 1 a unit is formed of the cover 9 with the negative plates 3 and in connection therewith a fixed negative pole 10 is provided.

The bridge-piece 5 of the positive plates 7 possesses a positive pole 11. After arranging the cover 9 this pole 11 projects through a pole-hole 12, but is further isolated from the cover. Further a filling-opening 13 is provided in the cover for the known purpose. According to the invention an accumulator is obtained whereby short-circuiting is absolutely prevented, whereas the dimensions are kept as small as possible.

I claim:—

1. An accumulator, comprising, a lead container forming part of the negative pole, negative plates fixed to the bottom of the container, positive plates spaced from the bottom and sides of the container, insulating separators resting on the bottom of the container and placed between the positive and negative plates and projecting above the tops of the negative plates, the positive plates being supported by the separators.

2. An accumulator according to claim 1, conducting bridges connected to said positive plates and spaced from the sides of said container, the bridges being supported by said separators, one of the bridges forming the accumulator positive pole.

3. An accumulator according to claim 1, conducting bridges connected to said positive plates and spaced from the sides of said container, the bridges being supported by said separators, one of the bridges forming the accumulator positive pole, a lead cover for said container and conductively connected thereto, said positive pole projecting through the cover and insulated therefrom, and a negative pole carried by the cover.

In testimony whereof I affix my signature.

LAMBERTUS ALPHONS LAMMERTS.